United States Patent [19]

Miyake et al.

[11] 4,216,009
[45] Aug. 5, 1980

[54] METHOD OF MAKING ALLOY AND CARBIDE POWDERS OF MOLYBDENUM AND TUNGSTEN

[75] Inventors: Masaya Miyake; Minol Nakano; Takaharu Yamamoto; Akio Hara, all of Itami, Japan

[73] Assignee: Sumitomo Electric Industries, Ltd., Osaka, Japan

[21] Appl. No.: 927,904

[22] Filed: Jul. 25, 1978

[30] Foreign Application Priority Data

| Jul. 27, 1977 | [JP] | Japan | 52-90618 |
| Jul. 29, 1977 | [JP] | Japan | 52-91684 |
| Nov. 2, 1977 | [JP] | Japan | 52-131860 |
| Dec. 29, 1977 | [JP] | Japan | 52-159300 |
| Apr. 28, 1978 | [JP] | Japan | 53-52050 |
| May 17, 1978 | [JP] | Japan | 53-59142 |
| May 17, 1978 | [JP] | Japan | 53-59143 |

[51] Int. Cl.$^2$ ................................................ C22C 29/00
[52] U.S. Cl. ............................. 75/0.5 AB; 75/0.5 BB; 75/0.5 BC; 75/121; 75/251; 148/16.5; 148/126; 423/440
[58] Field of Search ........ 75/0.5 AB, 0.5 BC, 0.5 BB, 75/121, 251; 148/16.5, 126; 423/440

[56] References Cited

U.S. PATENT DOCUMENTS

| 950,869 | 3/1910 | Schilling | 75/0.5 BB |
| 2,913,315 | 11/1959 | Welbon | 423/440 X |
| 3,418,103 | 12/1968 | Lasdon | 75/0.5 AB |
| 3,743,499 | 7/1973 | Ramqvist | 75/0.5 BC |
| 3,865,575 | 2/1975 | Volin et al. | 75/0.5 BC X |
| 3,916,497 | 11/1975 | Doi et al. | 75/0.5 BC |
| 3,953,194 | 4/1976 | Hartline et al. | 75/0.5 BC |
| 4,008,090 | 2/1977 | Miyake et al. | 423/440 X |
| 4,101,309 | 7/1978 | Koseki et al. | 75/0.5 BB |
| 4,139,374 | 2/1979 | Yih et al. | 423/440 X |

*Primary Examiner*—G. Ozaki
*Attorney, Agent, or Firm*—Wenderoth, Lind & Ponack

[57] ABSTRACT

The present invention relates to a process for the production of an alloy powder (Mo, W) for powder metallurgy, which comprises chemically or mechanically mixing molybdenum and tungsten in the form of compounds and reducing the mixed powder with hydrogen, and a process for the production of a hard solid solution (Mo, W)C from the alloy powder (Mo, W), which comprises carburizing the alloy powder (Mo, W).

20 Claims, 4 Drawing Figures

METHOD OF MAKING ALLOY AND CARBIDE POWDERS OF MOLYBDENUM AND TUNGSTEN

BACKGROUND OF THE INVENTION

1. Field of the Invention

The present invention relates to a fine powder composition consisting of Mo-W solid solution suitable for use as a starting material for powder metallurgy, a process for the production thereof and a process for the production of a hard solid solution using the fine powder composition.

2. Description of the Prior Art

The hitherto known solid solution of (Mo-W) has been used as W-Mo alloy wires (ordinarily, 50% W–50% Mo, 30% W–70% Mo). Since a W-wire tends to be brittle at a high temperature, but its solid solution is soft and the temperature coefficient of resistance tends to suppress electric current, (Mo-W) wires have favourably been used. Tungsten base alloys can be improved in their properties as heat resisting materials by dissolving molybdenum therein in various proportions. Such alloys are, for example, W-Mo-Ta, W-Mo-Nb-C, W-Mo-V, etc. Tungsten and molybdenum belong to the same Group of the Periodic Table, have similar properties and are capable of forming solid solutions in any proportions, so the solid solutions of tungsten and molybdenum make up for the defects of each other and it would be possible to develop a new material therefrom. The density of molybdenum is about half that of tungsten and, as the price of tungsten has lately risen, the price of molybdenum is only half that of tungsten. Therefore, the use of (Mo-W) alloys or solid solutions as a substitute for tungsten articles will be increased at a time when tungsten articles are expensive.

Up to the present time, however, alloys composed of solid solutions of (Mo-W) have not so been developed except (Mo-W) wires, because tungsten and molybdenum have very high melting points and thus dissolving should be carried out at a temperature of 3000° C. or higher so as to form such a solid solution. In 1952, Smithells proposed an electric current sintering method as a commercial method and substitute for the above described method. This method can be adapted to rod-shaped articles, but is not suitable for preparing tungsten articles and molybdenum articles having various shapes.

A tungsten powder produced by the prior art process for the production of tungsten powders contains a small amount of molybdenum (200 ppm) as an impurity, which tends to change the particle size of the tungsten powder and to change the electrical property of tungsten. Accordingly, in order to obtain the properties of high purity tungsten, many efforts have been made to decrease molybdenum in the refining step. Ores having a small content of molybdenum have been chosen and numerous studies have been made on a method of treating ores containing a large amount of molybdenum. However, none have proposed ideas whereby a large amount of molybdenum may be contained in tungsten, in opposition to the common knowledge.

It has hitherto been considered to be very difficult to powder (Mo-W) alloys, because these alloys are prepared by mixing molybdenum and tungsten, compacting and then subjecting to solid solution formation at a high temperature through the passage of electric current and sintering.

Up to the present time, as a starting material for cemented carbides, there has been used tungsten carbide (WC) powder as predominant component with a suitable binder metal, typically an iron group metal, to which carbides or carbonitrides of high melting point metals such as titanium, tantalum, niobium, molybdenum, hafnium, vanadium and chromium are added depending upon the requirements of a desired alloy. However, it is also true that tungsten is a relatively expensive metal and that it is found in only a few parts of the world. Accordingly, it is considered to be a so-called "strategic" material, and its availability can be subject to political considerations. Therefore, increase of the demand for cemented carbides consisting mainly of tungsten carbide meets inevitably with a problem of natural resources and if the tungsten carbide can be exchanged for another high melting point metal carbide, this exchange will have a great influence upon the industry.

Molybdenum monocarbide (MoC) is considered as a useful substitute, since this carbide only has the same crystal structure, a simple hexagonal type, as tungsten carbide, as well as mechanical properties similar to tungsten carbide. However, the existence of the hexagonal molybdenum monocarbide as a simple substance has remained in question to this date and thus an attempt to stabilize molybdenum has exclusively been carried out by forming a solid solution with tungsten carbide. This method was firstly reported by W. Dawihl in 1950, but this solid solution was not examined in detail and the commercial worth was not found in those days.

Of late, however, the study to utilize the solid solution $(Mo_xW_y)C$ where $x+y=1$ has become active with the rise of the price of tungsten. It is very interesting why a study on this solid solution and an attempt to use the same has not been carried out so actively up to the present time.

In the prior art process for the production of a solid solution of MoC-WC, WC, Mo and C powders or W, Mo, C and Co powders are mixed, charged in a carbon vessel and reacted at a temperature of 1600° to 2000° C. (W. Dawihl: "Zeitschrift f. Anorganische Chemie" 262 (1950) 212). In this case, cobalt serves to aid in forming the carbide and to dissolve molybdenum and carbon in the tungsten carbide. In the absence of cobalt, it is very difficult to obtain a solid solution of (Mo, W)C. When a (Mo, W)C powder obtained by this method is used for the production of a cemented carbide alloy with a binder metal of cobalt as a substitute for WC, however, (Mo, W)C decomposes in the alloy to deposit needle crystals of $(Mo, W)_2C$. Deposition of even a small amount of such a subcarbide with aggregation in the alloy causes deterioration of the strength of the alloy. For this reason, the use of MoC as a substitute for WC has not been attempted positively.

In a process for the production of mixed carbides, in general, carbides are heated in the presence of each other, optionally using a diffusion aiding agent such as cobalt, to give a uniform solid solution in most cases, but in the case of a composition of solid solution containing at least 70% of MoC, a uniform solid solution cannot be obtained by counter diffusion only at a high temperature. This is due to the fact that MoC is unstable at a high temperature and is decomposed into solid solutions such as $(Mo, W)C_{1-x}$ and $(Mo, W)_3C_2$ and, consequently, a solid solution (Mo, W)C of WC type cannot be formed only by cooling it. As a method of stabilizing this carbide, it has been proposed to react the components once at a high temperature, to effect diffusion of $Mo_2C$ and $WC$, and to hold the product at a low temperature for a long time (Japanese Patent Application (OPI) No. 146306/1976). However, a considerably long diffusion time and long recrystallization time are required for forming (Mo, W)C from (Mo, W)$C_{1-x}$ and (Mo, W)$_3C_2$ at a low temperature. For the practice of this method on a commercial scale, the mixture should be heated for a long time in a furnace to obtain a complete carbide. This means that the productivity per furnace is lowered and a number of furnaces are thus required. When using a continuous furnace, on the other hand, a long furnace is necessary and mass production is difficult industrially.

SUMMARY OF THE INVENTION

It is an object of the present invention to provide a fine powder composition consisting of Mo-W solid solution suitable for use as a starting material for powder metallurgy.

It is another object of the present invention to provide a process for the production of a fine powder suitable for use as a starting material for powder metallurgy, consisting of a Mo-W solid solution and having a particle size of 20 microns or less.

It is a further object of the present invention to provide a process for the production of a hard solid solution containing molybdenum and tungsten.

It is a still further object of the present invention to provide a process for producing on a commercial scale a uniform solid solution (Mo, W)C, whereby the disadvantages of the prior art can be overcome.

These objects can be attained by a starting alloy powder for powder metallurgy, which consists of a solid solution of molybdenum and tungsten in which the quantity of tungsten contained in molybdenum ranges from 5 at. % to 95 at. % and which has a particle size of 20 microns or less, and a process for the production of a hard solid solution containing molybdenum and tungsten, which comprises reducing a mixture of molybdenum oxide or hydroxide and tungsten oxide or hydroxide to form an alloy powder and then subjecting the alloy powder to carburization.

BRIEF DESCRIPTION OF THE DRAWINGS

The accompanying drawings illustrate the principle and merits of the present invention in more detail.

DETAILED DESCRIPTION OF THE INVENTION

Figure 1:
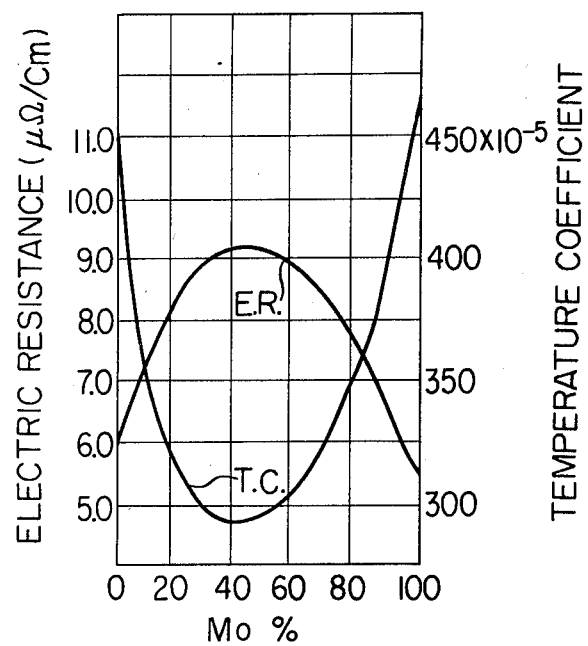
FIG. 1 shows graphically the relation of the electric resistance and temperature coefficient of a solid solution of molybdenum and tungsten based on the quantity of molybdenum.

The inventors have made various efforts to provide a solid solution (Mo-W) in an economical manner based on the thought that if an alloy consisting of a solid solution (Mo-W) can be prepared at a low cost and a (Mo-W)C powder as a hard material can readily be produced on a commercial scale, the uses of these materials or their cemented carbide alloys will remarkably be enlarged and consequently, have found that when molybdenum and tungsten are mixed in the refining step, a (Mo-W) alloy powder can be easily prepared. It is further found that the powder obtained by this method is compacted and sintered to readily give a powder metallurgical article consisting of a (Mo-W) alloy and, when this is carburized, a (Mo-W)C powder is formed, from which a new hard alloy can be developed.

That is to say, one feature of the present invention consists in using an alloy powder consisting of a solid solution of molybdenum and tungsten and having a particle size of at most 20 microns as a starting material for powder metallurgy.

The inventors have found that when molybdenum and tungsten are mixed in the refining step or in the stage of oxides, it is not always necessary to effect the reaction at a high temperature and a (Mo-W) alloy powder can be obtained at a relatively low temperature. Furthermore, it is found that the particle size of an alloy powder can be adjusted within a range of 0.5 to 10 microns by suitably selecting the reducing conditions in the step of forming the alloy powder.

For example, the alloy powder containing molybdenum and tungsten is prepared by reducing a mixed powder obtained (1) by mixing an ammonium salt of tungsten (e.g., ammonium tungstate) and ammonium salt of molybdenum (e.g., ammonium molybdate) in the form of a solution to coprecipitate parasalts of tungsten and molybdenum, (2) by coprecipitating $WO_3$ and $MoO_3$ with nitric acid or hydrochloric acid or (3) by mixing previously prepared oxides or hydroxides completely in a mechanical manner.

In another example, mixing of the metallic elements can be carried out by mixing any compounds of different types or solutions thereof, for example, by mixing molybdenum oxide and tungsten hydroxide, molybdenum hydroxide and tungsten oxide, molybdenum chloride and tungsten oxide, molybdenum oxide and tungsten chloride, ammonium molybdate and tungsten oxide, molybdenum oxide and ammonium tungstate and so on. These compounds can optionally be used in the form of solutions, if any.

Of course, as a method of preparing an alloy powder of molybdenum and tungsten, it is considered possible to obtain a solid solution by heating and diffusing a mixed metallic powder, but, in this method, pulverizing is troublesome. If the powder used is fine, the heating temperature can be lowered and this method can be put to practical use. In the diffusion of molybdenum in tungsten, the relation of the size of diffusible particles with the heating temperature is shown in Table 1:

Table 1

| Heating Temperature (°C.) | Diffusion Coefficient (Single Crystal) (cm²/sec) | Particle Diameter Forming Solid Solution (μ) |
|---|---|---|
| 1600 | $7.6 \times 10^{-15}$ | 0.05 |
| 1800 | $1.2 \times 10^{-13}$ | 0.2 |
| 2000 | $1.1 \times 10^{-12}$ | 0.6 |
| 2200 | $5.4 \times 10^{-11}$ | 4.4 |

That is to say, in a heating time of 1 hour, a fine powder with a particle size of about 0.5 micron can well be converted into a solid solution at a temperature of 2000° C. or lower, but it is difficult to prepare an alloy powder from a powder with a particle size of 1 micron or more since such a powder requires a heating temperature of 2000° C. or higher.

On the contrary, if the mixing is carried out in the form of compounds such as oxides and hydroxides or in the form of solutions thereof according to the present invention, the resulting mixed powder has such a small particle size that it can be converted into a solid solution at a relatively low temperature. The alloy powder obtained by the process of the present invention is converted into a complete (Mo, W)C powder by reacting it with carbon and heating at a temperature of 1400° C. or higher. When it is desired to obtain a coarse particle (Mo, W)C powder, the reducing temperature of (Mo, W)O₃ is increased and the carburizing temperature is raised, thereby obtaining a carbide with a particle size of about 6 microns.

The present invention is available for not only combinations of just molybdenum and tungsten but also for these components further mixed with at least one selected from the Group IVa, Va and VIa elements, i.e., titanium, zirconium, hafnium, vanadium, tantalum, niobium, and chromium. These elements can be incorporated in a solid solution (Mo, W) by mixing in the form of compounds, for example, oxides, individually or in combination.

The (Mo, W) powder obtained by the process of the present invention as described above is mixed with some quantity of a binder metal such as nickel, compacted and sintered to give an article for powder metallurgy and, after carburization, it can be used as a substitute for tungsten carbide in the field of hard materials.

The feature of the present invention is that a starting material for an alloy is a solid solution of molybdenum and tungsten. The solid solution of molybdenum and tungsten can be examined by X-ray analysis under the following conditions: $CuK_\alpha$, 40 KV, 80 mA, Ni Filter, Slit (ds)=2°, Light Receiving Slit (rs)=0.15 mm, Scatter Slit=2°, Measurement Angle $2\theta = 131°-132°$, Scanning Speed 1°=1 minute, Chart Speed 4 cm=1 minute, Time Constant=2 seconds. Under there measurement conditions, the peak wave form of plane (3, 2, 1) shows a uniform solid solution.

In the present invention, the particle or grain size of the powder is preferably 20 microns or less, since if more than 20 microns, the reactivity and moldability of the powder is deteriorated so that the powder is not suitable for powder metallurgy.

In the present invention, the quantity of tungsten contained in molybdenum ranges preferably from 5 at. % to 95 at. %, since if less than 5 at. %, the property of molybdenum is so strong that there is no effect as a solid solution and, when the solid solution is carburized, the carburized product is not stabilized as (Mo, W)C and sometimes decomposes in (Mo, W)₂C+C, while if more than 95 at. %, in other words, if the quantity of molybdenum in tungsten is less than 5 at. %, the property of tungsten is so strong that there is no effect as a solid solution. The change of the electric resistance is representative of the property of a solid solution. FIG. 1 shows graphically the change of the electric resistance and temperature coefficient of a solid solution containing molybdenum and tungsten based on the quantity of molybdenum. As can be seen from these results, the starting material for powder metallurgy according to the present invention shows stable properties within a range of 5 to 95 at. %.

As powder metallurgical articles from alloy powders consisting of solid solutions of molybdenum and tungsten, there are (Mo-W) alloy wires, boats, nozzles, dies, contact materials, high temperature nozzles for rockets, etc. An oxidation resistance coating can be applied to the surfaces thereof so as to lengthen their lives. When using the article as an electric contact material with copper or silver, on the other hand, there is obtained an advantage that a clean surface can always be held due to vaporization of molybdenum. When using as a hard material, the solid solution is reacted with carbon and sintered with a binder metal such as cobalt, nickel, iron, chromium and the like.

We, the inventors, have made studies on a process for producing a stable carbide (Mo, W)C considering that if (Mo, W)C is stabilized in the alloy, this powder can favourably be used as a substitute for WC and, consequently, have reached the following new discovery.

Figure 2:
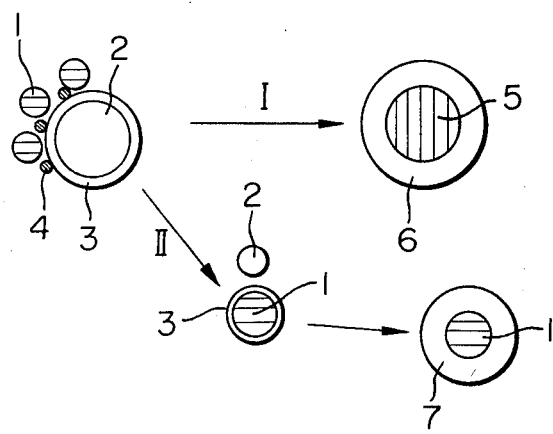
FIG. 2 and FIG. 3 show reaction models to illustrate a process of formation of a solid solution (Mo, W)C, the model of FIG. 2 being according to the prior art method and that of FIG. 3 being according to the present invention.

FIG. 2 shows a reaction model to illustrate a process of forming (Mo, W)C from WC, Mo₂C and C according to the prior art. In the case of reacting Mo₂C(1) and WC(2) using Co(3), there are two systems. (4) is C. In one system represented by an arrow I wherein heating is carried out at a temperature of 1600° C. or higher, Co(3) is melted and forms a film around WC powder (2) and through Co(3), Mo and C are diffused in WC(2). At this time, a compound of $(Mo_xW_y)C$ is formed in the interior of the WC powder to give a difference in composition between the interior and exterior. That is to say, there are formed a WC enriched $(Mo_{x1}W_{y1})C$ phase (5) in the interior and a MoC enriched $(Mo_{x2}W_{y2})C$ phase (6) in the exterior, in which $x_1 < x_2$ and $y_1 > y_2$.

In another system represented by an arrow II, a film of Co(3) is formed around Mo₂C(1) and in this case also, WC(2) and C(4) are diffused through Co in Mo₂C(1) to form a $(Mo_{x3}W_{y3})C$ phase (7). In such a reaction system, MoC is enriched in the interior part of the powder, and not only the carburizing reaction, but also particle growth, takes place because Co is used as a diffusion aiding agent. That is to say, the diffusion phenomenon in the interior of the particle and the sintering phenomenon of the particles each proceed simultaneously and, consequently, it is difficult to obtain a powder with a uniform composition and uniform particle size. Although there is such unevenness inside the particle, a single phase is detected by X-ray analysis due to the similar lattice constants of WC and MoC. However, when the sintering is carried out with a large amount of Co as a binder, the alloy structure is not stabilized. If the amount of WC dissolved in MoC is small, MoC is decomposed into Mo₂C and C. Therefore, X-ray analysis shows the presence of one phase of the WC peak only, but there are MoC-enriched portions so that the alloy structure is not stable.

For the above described reasons, a solid solution of MoC and WC has not been used. However, if the solid solution with one complete phase is obtained, it would be expected that it can favourably be used as a starting material for cemented carbides without decomposition of MoC in the alloy.

The second feature of the present invention is a process for producing a solid solution composed of at least one hard phase consisting of a compound selected from mixed or composite carbides, carbonitrides and oxycarbonitrides of molybdenum and tungsten and having a crystal structure of simple hexagonal WC type, which comprises mixing compounds of molybdenum and tungsten in the form of solutions and/or oxides (or hydroxides), reducing the mixture with hydrogen and/or ammonia to form an alloy powder and carburizing the alloy powder to thus form a hard solid solution containing molybdenum and tungsten. Useful examples of the compounds of molybdenum and tungsten used in this process are oxygen-containing compounds such as oxides and hydroxides, salts such as chlorides, sulfates and nitrates, metallic acids and their salts. These compounds can be mixed as is or in such a manner that at least one compound is in the form of a solution.

The hard solid solution obtained by the above described process is represented by the following general formula:

$$(Mo_xZ_y)(C_aN_bO_cH_d)$$

In this formula, Z represents tungsten, optionally with at least one element of titanium, zirconium, hafnium, vanadium, niobium, tantalum and chromium selected from the Group IVa, Va and VIa of the Periodic Table, x and y represent suitable numbers satisfying the relation of $x+y=1$, and a, b, c and d represent suitable numbers satisfying the relation of $a+b+c+d \leq 1$, the sum being preferably near 1. Preferably, the above described solid solution is of a crystal structure of a simple hexagonal WC type and has a composition of material which comprises molybdenum and tungsten, the proportion of molybdenum being at least 10 mol % based on metallic elements, with 0 to 40 mol % based on metallic elements of the Group IVa, Va and VIa elements and non-metallic elements consisting mainly of C and N.

Figure 3:
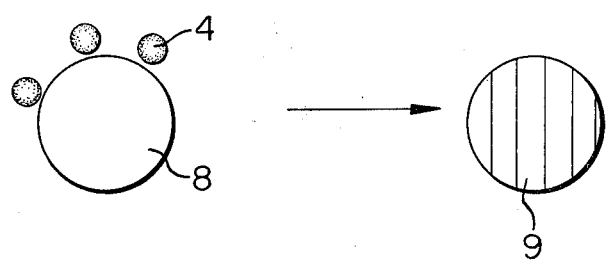

The process of the present invention proceeds as shown in FIG. 3 in which (4) is C, (8) is (Mo, W) phase and (9) is (Mo, W)C phase. This is characterized in that a diffusion aiding agent such as Co is not used, which has hitherto been considered to be impossible. That is to say, since molybdenum and tungsten form solid solutions in any proportions, a solid solution (Mo, W)C should be formed without using cobalt, by carburization of the solid solution (Mo, W). However, this method has not been so examined because the solid solution (Mo, W) is obtained by mixing molybdenum and tungsten, compacting and then subjecting to a solid forming treatment at a high temperature by the passage of electric current and, therefore, powdering of this alloy has been thought very difficult.

As set forth above, the inventors have found that when molybdenum and tungsten are mixed in the refining step or in the stage of oxides, it is not always necessary to effect the reaction at a high temperature and a (Mo, W) alloy powder can be obtained at a relatively low temperature. Furthermore, it is found that the particle size of the alloy powder can be adjusted within a range of 0.5 to 10 microns by suitably selecting the reducing condition in the step of forming the alloy powder. If molybdenum and tungsten are dispersed in atomic order, it is not necessary to use a diffusion aiding agent such as cobalt, but in order to increase the reaction speed further, it is sufficient to add a trace amount of cobalt during production of the alloy powder. The addition of cobalt in a trace amount serves to promote the carburization reaction only and results in no formation of abnormal particles, uneven composition, etc.

For example, the alloy powder containing molybdenum and tungsten is prepared, as set forth above, by reducing a mixed powder obtained (1) by mixing an ammonium salt of tungsten and ammonium salt of molybdenum in the form of a solution to coprecipitate para-salts of tungsten and molybdenum, (2) by coprecipitating $WO_3$ and $MoO_3$ with nitric acid or hydrochloric acid or (3) by mixing previously prepared oxides or hydroxides completely in a mechanical manner. The alloy powder obtained in this way is then mixed with carbon powder and carburized at a temperature of 1200° C. or higher. The carburization temperature, depending on the particle size of the alloy powder, is preferably at least 1400° C.

The present invention can with advantages be adapted to not only carbides but also those in which a part of carbon is replaced by nitrogen or oxygen. In particular, replacement of carbon, in part, with nitrogen or oxygen is advantageous to further stabilize the simple hexagonal phase of (Mo, W)C.

In one embodiment of the present invention, a particle growth promoter such as sodium and potassium is added, for example, before the reduction of a molybdenum compound and tungsten compound such as $MO_3$ and $WO_3$ with hydrogen or before the carburization of the reduced (Mo, W) powder, and the particle growth is thus promoted during the reducing reaction or carburizing reaction. In the reducing reaction of molybdenum and tungsten, the two elements are mixed and, consequently, the particle growth is difficult. The powder obtained in the general reducing reaction or carburizing reaction is a fine powder, such as having a particle size of 1 micron, in spite of the fact that a particle size of 2 to 5 microns is most suitable for a starting material of cemented carbides. Therefore, an effective particle growth promoter has been desired and to this end, the inventors have made efforts to find an element capable of aiding the reaction and thus promoting the particle growth. Thus, it is found that sodium and potassium are reacted with molybdenum and tungsten to cause an active particle growth promoting effect. The additive quantity of sodium and potassium is preferably 100 to 5000 ppm since if less than 100 ppm, such an effect cannot be given, while if more than 5000 ppm, there are formed compounds of (Mo, W) powder with sodium and potassium, which have bad influences. Addition of sodium and/or potassium is generally carried out in the form of their compounds such as sodium carbonate, potassium carbonate and the like or in the form of a vapor to be added to a gas flow in a furnace.

In another embodiment of the present invention, a particle growth retarder such as titanium, vanadium and chromium is added before or after the reducing reaction. To illustrate by way of example, titanium, vanadium and/or chromium in the form of oxides are allowed to coexist in the mixture so as to prevent the unevenness due to the difference in degree of reduction between molybdenum and tungsten and to retard the particle growth, whereby formation of the solid solution of molybdenum and tungsten can well be completed. The carbide obtained in this way is uniform and suitable for use as a starting material for cemented carbides. Most preferably, such a particle retarder is added before the reducing reaction to control the particle size of the reduced powder and to form a uniform solid solution, but even if added after the reduction, retarding of the particle growth is effected in the carburizing reaction. The additive quantity of the particle growth retarder such as titanium, vanadium and chromium is preferably 0.05 to 3% by weight under the condition to form the hexagonal monocarbide of (Mo, W)C, since if less than 0.05% by weight, such an effect cannot be expected, while if more than 3% by weight, it is difficult to prepare (Mo, W)C in a stable manner.

In a further embodiment of the present invention, a carburization reaction retarder such as sulfur or compounds thereof is added before or after the reducing reaction. During the reducing or carburizing reaction, sulfur vapor is sublimated to retard the reducing reaction of $WO_3$ and $MoO_3$. Consequently, the reaction of forming the solid solution of W and Mo is carried out simultaneously with the reducing reaction and, even during the carburizing reaction, the reaction of forming the solid solution of W and Mo is also promoted. The solid solution obtained in this way is of coarse particles having a uniform particle size distribution.

In a still further embodiment of the present invention, the stability of the (Mo, W)C powder can be increased by carrying out the final heating step in an inert atmosphere or in a carbon monoxide atmosphere when the solid solution (Mo, W) is reacted with carbon to form the monocarbide. That is to say, the reaction is carried out in nitrogen gas, carbon monoxide gas or a mixed gas of carbon monoxide and carbon dioxide so as to prevent decomposition of the carbide and, as occasion demands, iron, nickel and cobalt are used as a diffusion aid. In particular, iron can be added in the form of $Fe_3C$ to supply carbon. The amount of iron, nickel or cobalt contained in the mixed powder is preferably 0.5% or less, since if more than 0.5%, the powder particles are sintered to each other and alloyed, and recovery as powder is difficult. In the case of using cobalt or nickel of the iron group metals, supply of carbon is not carried out so actively and it should be added in an amount of about 1%, since the stabilizing effect of the carbide is small. The heating temperature is preferably 1200° C. or more and heating at a temperature of 2000° C. or higher is not desirable, since it results in an unstable (Mo, W)C.

In the process of the present invention, the stability of the hexagonal monocarbide solid solution can be raised by heating the mixed powder at a temperature of 1400° C. or higher, then cooling once to room temperature to give a strain to the primary reaction product and reheating at a temperature of 1000° to 1800° C. The feature of this treatment consists in converting molybdenum carbide into that of a simple hexagonal type crystalline structure of WC type by a method wherein, since a carbide consisting mainly of MoC is not stable at room temperature, at least one other carbide such as WC is dissolved therein at a high temperature, the solid solution is cooled to normal temperature, subjected to a mechanical or thermal treatment to give a strain thereto and reheated at a temperature at which MoC is stable. In processes for the production of mixed carbides, in general, carbides are heated in the presence of each other, optionally using a diffusion aiding agent such as cobalt, to give a uniform solid solution in most cases, but in the case of a composition of solid solution containing at least 70% of MoC, a uniform solid solution cannot be obtained by counter diffusion only at a high temperature. This is due to the fact that MoC is unstable at a high temperature and is decomposed into solid solutions such as (Mo, W)$C_{1-x}$ and (Mo, W)$_3C_2$ and, consequently, the WC type solid solution of (Mo, W)C cannot be obtained by cooling. As a method of stabilizing this carbide, it has been proposed to react the components once at a high temperature, to effect diffusion of $Mo_2C$ and WC, and to hold the product at a low temperature for a long time (Japanese Patent Application (OPI) No. 146306/1976). However, a considerably long diffusion time and long recrystallization time are required for forming (Mo, W)C from (Mo, W)$C_{1-x}$ and (Mo, W)$_3C_2$ at a low temperature. For the practice of this method on a commercial scale, the mixture should be heated for a long time in a furnace to obtain a complete carbide. This means that the productivity per furnace is lowered and a number of furnaces are thus required. When using a continuous furnace, on the other hand, a long furnace is necessary and mass production is difficult industrially.

The solid solution-forming treatment of the present invention comprises providing a mixture of a mixed carbide of (Mo, W)$_2$C+(Mo, W)C with carbon by the diffusion reaction of molybdenum and tungsten, then cooling the mixture rapidly to room temperature to obtain a primary carbide as unreacted at a high temperature, while retaining several percent of carbon in the powder bed, subjecting the primary carbide to action of a mechanical grinder and finally reheating in a short time at a temperature at which (Mo, W)C is stable, thereby converting completely into a complete monocarbide (Mo, W)C powder. When this mechanical grinding is troublesome, the rapid cooling speed is increased using a continuous furnace to cause a rapid shrinkage of the reaction product and to strain the reaction product, and the reaction product is reheated to promote the solid solution-forming reaction.

According to this treatment, a large quantity of the mixed powder can be treated by the combination of continuous furnaces, and provision of a simple impact means on the way always results in a stable carbide. Where the primary reaction product has an uneven portion, a stable carbide cannot be obtained even if the heating conditions are changed. In the process of the invention, the evenness of the reaction product is increased and the reaction proceeds well during the secondary heating. This heat treatment is best carried out where the quantity of MoC exceeds 70% and the MoC lacks stability.

The following examples are given in order to illustrate the present invention in detail without limiting the same, in which % is by weight unless otherwise indicated.

EXAMPLE 1

54 g of Mo powder and 46 g of W powder were dissolved in 28% aqueous ammonia and the resulting ammonium salts were gradually neutralized with hydrochloric acid to precipitate needle-like crystals. In this precipitate, $WO_3$ and $MoO_3$ were finely mixed. The mixed oxides were fired at 800° C. in the air and sintered. The mixed powder having a particle size of about 0.8 micron was charged in a nickel boat, which was then covered, and subjected to reduction at 1000° C. in a hydrogen stream to obtain a starting mixed powder with a particle size of 2 microns.

EXAMPLE 2

The starting mixed powder of Example 1 was mixed with nickel powder in a proportion of 1%, ball milled for 20 hours, compacted in a predetermined shape and sintered at 1400° C. For comparison, a sintered body was prepared by similarly mixing and sintering 46 g of W powder with a particle size of 1 micron, 54 g of Mo powder with the same particle size and 1 g of Ni powder with the same particle size.

The physical properties of these alloys are shown in Table 2:

Table 2

| | Hardness (HV) 1100° C. | Transverse Rupture Strength (Kg/mm$^2$) | Structure |
|---|---|---|---|
| Alloy of Present Invention | 70 Kg | 100 | Few Pores |
| Comparative Alloy | 60 Kg | 30 | Numerous Pores |

As evident from the results, the alloy of the present invention is excellent in sintering property and has a higher toughness than the prior art alloy for comparison.

When the alloy of the present invention was used as a piercing die for the production of an alloyed steel pipe, it showed, in particular, a very excellent wear resistance due to a higher rigidity of tungsten and higher lubricating property of molybdenum oxide film. In addition, the alloy of the present invention was used as a core and die insert during die casting of aluminum alloys, brasses and bronzes with more excellent performances than the prior art alloys.

EXAMPLE 3

The $(Mo_{0.3}W_{0.7})$ powder with a particle size of 2 microns obtained by the procedure of Example 1 was compacted and formed in a sheet of 5 mm in thickness and sintered at 1800° C. for 1 hour. After the sintering, the sheet was rolled to give a thickness of 2 mm and formed into a boat. When the boat was used in a sintering furnace for the production of a powder metallurgical article, it showed a higher oxidation resistance as well as a higher deformation resistance and a life of 3 times as long as a boat of molybdenum.

EXAMPLE 4

A (Mo, W) powder having a particle size of 2 microns was prepared by the procedure of Example 1, mixed with 9.0% of carbon powder and ball milled for 36 hours. The mixed powder was reacted at 1700° C. in a hydrogen stream for 1 hour. The thus resulting carbide was subjected to analysis to obtain results as shown in Table 3.

Table 3

| Total Carbon | Free Carbon | Combined Carbon | Combined Carbon Theoretical Carbon |
|---|---|---|---|
| 8.93% | 0.02% | 8.91% | 99.8% |

As evident from the results of Table 3, the carbon was combined sufficiently and theoretically, thus forming a monocarbide of WC type.

For comparison, 43.7 g of WC powder with a particle size of 1 micron, 53 g of Mo$_2$C powder with a particle size of 2 microns, 3.3 g of carbon powder and 0.5 g of Co powder were mixed and ball milled for 36 hours. When the resulting mixed powder was reacted at 1700° C. (A) and at 1900° C. (B) in a hydrogen stream, there was obtained no theoretical carbide as shown in Table 4:

Table 4

| | Heating Temperature | Total Carbon | Free Carbon | Combined Carbon Theoretical Carbon |
|---|---|---|---|---|
| Prior Art (A) | 1700° C. | 8.91% | 1.38% | 84.8% |
| Prior Art (B) | 1900° C. | 8.92% | 0.45% | 95.4% |

X-ray diffraction showed that Mo$_2$C was detected in the carbide.

EXAMPLE 5

33 Kg of WO$_3$ powder with a particle size of 2 microns and 24 Kg of MoO$_3$ with the same particle size were ball milled with stearic acid as a mixing aid for 30 hours. The mixture was charged in a kneader with 30 liters of warm water at 80° C. and kneaded for 1 hour. Then, the mixture was extruded to form pellets with an extruded diameter of 1 mm $\phi$ by means of an extruder and dried. The pellets were partly reduced at 600° C. for 30 minutes in a hydrogen furnace and held at 1200° C. for 60 minutes similarly in the hydrogen furnace. X-ray analysis showed that the degree of the solid solution formation was good. The reduced (Mo, W) alloy powder had a particle size of 4 microns with a narrow particle size distribution. The alloy powder was mixed with 9% of carbon powder and ball milled for 30 hours. The mixed powder was reacted at 1600° C. in a nitrogen stream to obtain a carbide having properties as shown in Table 5:

Table 5

| | Total Carbon | Free Carbon | O$_2$ | N$_2$ | Particle Size |
|---|---|---|---|---|---|
| (Mo, W)C Powder | 8.95% | 0.05% | 0.12% | 0.2% | 6µ |

EXAMPLE 6

Hydrochloric acid was gradually added to a solution of ammonium salt of tungsten to precipitate H$_2$WO$_4$, while hydrochloric acid was added to a solution of ammonium salt of molybdenum to precipitate H$_2$MoO$_4$. Both the solutions were mixed, stirred adequately and filtered to obtain a precipitate. The thus obtained precipitate was washed with water adequately and fired at 300° C. in the air, after which the product was subjected to reduction at 1000° C. in a hydrogen stream for 3 hours, thus obtaining a (Mo, W) alloy powder with a particle size of 7 microns. The obtained (Mo, W) alloy powder having a Mo to W ratio of 8:2 was mixed with 9.6% of carbon powder and reacted at 1800° C. in a hydrogen stream for 1 hour.

EXAMPLE 7

A sublimated MoO$_3$ powder with a particle size of 20 microns was adequately ball milled, to which H$_2$WO$_4$ was added in the form of a slurry, and wet process mixing was continued for 30 hours. The resulting slurry-like mixture was kneaded in a kneader, dried and pulverized. The sufficiently dried mixed powder was then subjected to reduction at 800° C. in a hydrogen furnace for 1 hour and further heated at 1400° C. to complete the reduction and solid solution formation, thus obtaining a (Mo, W) alloy powder having a particle size of 5 microns with a narrow particle size distribution. The alloy powder, having a Mo to W ratio of 7:3, was mixed with 9% of carbon powder necessary for the production of the monocarbide and 1% of Fe$_2$O$_3$ as a reaction promoter, reacted at 1800° C. in a Tammann-furnace and further reacted at 1400° C. in a nitrogen stream, thus obtaining a carbide having the property tabulated below:

Table 6

| Total Carbon | Free Carbon | Combined Carbon | O₂ | N₂ |
|---|---|---|---|---|
| 8.90% | 0.1% | 8.80% | 0.1% | 0.3% |

EXAMPLE 8

WO₃ powder having a particle size of 1 micron and MoO₃ powder having a particle size of 2 microns were adequately ball milled, to which 10% aqueous ammonia was added to improve the mixing property, and the mixture was kneaded for 5 hours in a kneader to obtain a gel-like mixture of MoO₃ and WO₃, followed by drying. On the other hand, the same WO₃ and MoO₃ powders were ball milled for comparison. These two mixed powders were respectively subjected to a reducing experiment in a hydrogen furnace.

Figure 4:
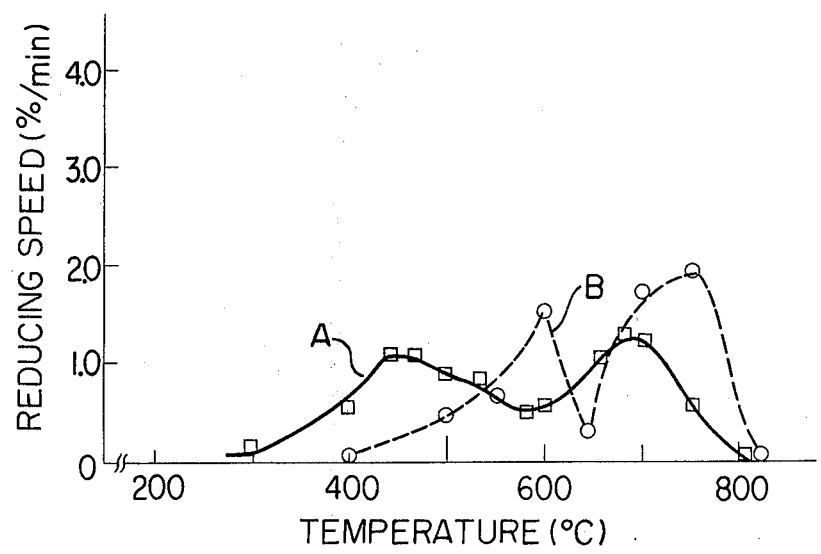
FIG. 4 shows the difference in reducing curves between Samples A and B obtained in Example 8.

FIG. 4 shows graphically the change of the decreased quantity during the reducing reaction as to Sample A mixed densely and Sample B mixed mechanically. In the case of Sample A, the reduction proceeds at a low temperature and the solid solution forming reaction proceeds well, while in the case of Sample B, the reduction of WO₃ and MoO₃ proceeds separately and the solid solution forming reaction does not so proceed.

These reduced powders were carburized according to the procedure of Example 6 to obtain carbides having the following properties:

Table 7

|  | Total Carbon | Free Carbon | Combined Carbon | X-ray Analysis |
|---|---|---|---|---|
| Sample A | 8.95% | 0.05% | 8.90% | MC type |
| Sample B | 0.99% | 3.21% | 5.78% | M₂C type |

As can be seen from these results, Sample A gives a monocarbide of MC type, while Sample B gives a carbide of M₂C.

EXAMPLE 9

54 g of Mo powder and 46 g of W powder were dissolved in 28% aqueous ammonia and the resulting ammonium salts were gradually neutralized with hydrochloric acid to precipitate needle-like crystals. In this precipitate, WO₃ and MoO₃ were densely blended or mixed. The mixed oxides were then fired and sintered at 800° C. in the air. The mixed powder was charged in a nickel boat, which was then covered, and subjected to reduction at 1000° C. in a hydrogen stream to obtain an alloy powder having a particle size of 4 microns.

The so obtained alloy powder was mixed with 9.0% of carbon powder and ball milled for 36 hours. The mixed powder was heated under various heating conditions to obtain carbides with properties as shown in Table 8. In Run Nos. 1 to 5, the carburization was carried out in a nitrogen atmosphere without using a diffusion aiding agent to give a reactivity of 50 to 60%. In Run Nos. 6 and 7, cobalt was used as a diffusion aiding agent and the reactivity was increased to 98%, but heating for a long time was necessary and, due to the hard powder, grinding had to be effected for a long time. In Run Nos. 8 and 9, the carburization was carried out in a nitrogen atmosphere using 0.2% of iron for 1 hour to give a reactivity of 100% and to obtain a good quality carbide to be easily ground. In Run Nos. 10 to 14, heating was similarly carried out in a hydrogen atmosphere, but the reactivity was only 80 to 90% and a good quality carbide was not obtained.

Table 8

| Run Nos. | Atmosphere | Temperature (°C.) | Time (hr) | Diffusion Aiding Agent | T.C.* | F.C.** | C.C.*** | Reactivity**** (%) |
|---|---|---|---|---|---|---|---|---|
| 1 | N₂ | 1400 | 1 | No | 9.05 | 4.0 | 5.26 | 59 |
| 2 | N₂ | 1600 | 1 | No | 9.03 | 4.1 | 5.14 | 58 |
| 3 | N₂ | 1700 | 1 | No | 9.02 | 4.1 | 5.14 | 58 |
| 4 | N₂ | 1800 | 1 | No | 9.02 | 4.1 | 5.14 | 58 |
| 5 | N₂ | 1400 | 5 | No | 9.06 | 3.2 | 6.02 | 67 |
| 6 | N₂ | 1400 | 3 | Co 0.5% | 8.95 | 0.76 | 8.29 | 93 |
| 7 | N₂ | 1700 | 3 | Co 0.5% | 8.95 | 0.20 | 8.77 | 98 |
| 8 | N₂ | 1400 | 1 | Fe 0.2% | 8.97 | 0.05 | 8.94 | 100 |
| 9 | N₂ | 1500 | 1 | Fe 0.2% | 9.00 | 0.10 | 8.93 | 100 |
| 10 | H₂ | 1400 | 1 | Fe 0.2% | 8.97 | 2.4 | 6.75 | 76 |
| 11 | H₂ | 1550 | 1 | Fe 0.2% | 8.92 | 3.6 | 5.53 | 62 |
| 12 | H₂ | 1400 | 1 | Fe 0.3% | 8.91 | 1.4 | 7.64 | 86 |
| 13 | H₂ | 1250 | 1 | Fe 0.3% | 8.95 | 1.4 | 7.68 | 86 |
| 14 | H₂ | 1550 | 1 | Fe 0.3% | 8.94 | 2.3 | 6.82 | 76 |

Note:
*T.C. = Total Carbon,
**F.C. = Free Carbon,
***C.C. = Combined Carbon,
****Reactivity = (Combined Carbon/Theoretical Carbon) × 100

EXAMPLE 10

A (Mo, W) alloy powder, prepared in an analogous manner to Example 1, was mixed with 9.0% of carbon powder and ball milled for 36 hours. To this mixed powder was added 0.2% of nickel as a diffusion aiding agent and the mixture was heated at 1800° C. in a hydrogen atmosphere for 1 hour, followed by cooling to room temperature, thus obtaining a carbide having a total carbon content of 8.99%, a free carbon content of 3.7%, a nitrogen content of 0.035% and an oxygen content of 0.056% with a reactivity of 62%. The thus resulting carbide was further carburized under carburizing conditions tabulated below:

Table 9

| Carburizing Condition* | Atmosphere | T.C. | F.C. | O₂ | N₂ | Reactivity |
|---|---|---|---|---|---|---|
| (1) | H₂ | 8.99% | 3.7% | 0.056% | 0.035% | 62% |

Table 9-continued

| Carburizing Condition* | Atmosphere | T.C. | F.C. | $O_2$ | $N_2$ | Reactivity |
|---|---|---|---|---|---|---|
| (2) | $H_2$—CO | 8.96% | 0.02% | 0.11% | 0.019% | 100% |
| (3) | $H_2$—$N_2$ | 8.96% | 0.5% | 0.004% | 0.003% | 95% |

Note: Carburizing Condition
(1) 1800° C. × 1 hr ($H_2$)
(2) 1800° C. × 1 hr ($H_2$); After cooling to room temperature, reheating at 1380° C. × 1 hr; During cooling, introducing CO
(3) 1800° C. × 1 hr ($H_2$); After cooling to room temperature, carburizing at 1380° C. × 1 hr ($N_2$)

Under the carburizing condition (3), the reactivity was only 95%, while under the carburizing condition (2), a good quality carbide was obtained with a reactivity of 100%.

EXAMPLE 11

$WO_3$ powder with a particle size of 10 microns was mixed with a solution of $(NH_4)_2MoO_4$ to give a Mo to W molar ratio of 8:2 and adequately kneaded for about 3 hours until the $WO_3$ particles were attacked by $NH_3$ and $MoO_3$ adhered thereto to give a uniform mixture. This mixture was then subjected to evaporation to dryness and fired at 500° C. for 30 minutes in the air. The resulting powder contained oxides of molybdenum and tungsten under finely dispersed state, a part of which was dispersed in the form of (Mo, W)$O_3$. This powder was reduced at 900° C. for 2 hours in a hydrogen furnace to form a fine (Mo, W) powder with a particle size of 0.8 micron, and further subjected to a solid solution formation at 1400° C. in a hydrogen stream to obtain a (Mo, W) alloy powder with a particle size of 6 microns.

EXAMPLE 12

Solutions of $(NH_4)_2MoO_4$ and $(NH_4)_2WO_4$ were mixed to give a Mo to W molar ratio of 8:2 in such a manner that the sum of molybdenum and tungsten be 50 Kg and subjected to evaporation to precipitate square crystals (paraammonium salts). The resulting crystals were fired at 500° C. in the air and reduced at 900° C. for 2 hours with hydrogen at a hydrogen flow rate of 5 liters/min. The reduced powder was then subjected to a solid solution formation at 1500° C. to obtain a (Mo,W) powder with a particle size of 10 microns.

EXAMPLE 13

$MoO_3$ powder with a particle size of 5 microns and a slurry of $H_2WO_4$ were adequately mixed with a Mo to W molar ratio of 8:2. The mixed powder was then fired and reduced in an analogous manner to Example 11 to form a (Mo, W) powder, which was further subjected to a solid solution forming reaction at 1300° C. in a nitrogen atmosphere to thus obtain a uniform solid solution powder with a particle size of 3 microns.

EXAMPLE 14

The $(Mo_{0.8}W_{0.2})$ alloy powder obtained in Example 11 was mixed with 9.6% of carbon powder and subjected to a primary reaction at 1600° C. in a hydrogen stream. The resulting carbide was blackish and contained a large amount of free carbon, and was found to be not a complete carbide of simple hexagonal type but a mixed powder of (Mo, W)C, (Mo, W)$_2$C and C by X-ray analysis. Then, the mixed powder was reheated at 1400° C. in a CO atmosphere for 1 hour to obtain a (Mo, W)C powder, which was found to be a carbide with a crystalline structure of simple hexagonal WC type by X-ray analysis.

EXAMPLE 15

A high purity $CaWO_4$ powder was mixed with hydrochloric acid to form $H_2WO_4$ and washed adequately with water to obtain a slurry of $H_2WO_4$, while a solution of ammonium salt of molybdenum was mixed with hydrochloric acid to precipitate $H_2MoO_4$ and washed adequately with water to obtain a slurry of $H_2MoO_4$. Both the slurries were well mixed with a Mo to W atomic ratio of 8:2 and subjected to evaporation to dryness. The mixture was fired at 500° C. in the air, reduced with hydrogen at 900° C. for 2 hours to form a (Mo, W) powder and then subjected to a solid solution forming reaction at 1600° C. to form a complete (Mo, W) alloy powder with a particle size of 6 microns. This alloy powder was subjected to carburization in an analogous manner to Example 14, thus obtaining a monocarbide having a crystalline structure of a complete simple hexagonal type.

EXAMPLE 16

81 g of $MoO_3$ powder and 58 g of $WO_3$ powder were respectively dissolved in 28% aqueous ammonia and gradually added to a solution of hydrochloric acid to precipitate $H_2MoO_4$ and $H_2WO_4$. When the precipitation was completed, both the precipitates were mixed, washed with water and filtered to obtain a mixture of oxides. The resulting mixture was fired at 800° C. in the air, mixed with 3% of sodium carbonate, charged in a nickel boat, which was then covered, and reduced at 1200° C. in a hydrogen stream to form an alloy powder with a particle size of 6 microns.

The (Mo, W) alloy powder obtained in this way was instantaneously mixed with 9.0% of carbon powder and the mixed powder was reacted at 1700° C. in a hydrogen stream and a nitrogen stream for 1 hour. The thus resulting carbide was subjected to analysis to obtain results as shown in Table 10:

Table 10

| Total Carbon | Free Carbon | Combined Carbon | Combined Carbon Theoretical Carbon |
|---|---|---|---|
| 8.95% | 0.05% | 8.90% | 99.8% |

As evident from the results of Table 10, the carbon was combined sufficiently and theoretically, thus forming a monocarbide of WC type.

For comparison, 43.7 g of WC powder with a particle size of 1 micron, 53 g of $Mo_2C$ powder with a particle size of 2 microns, 3.3 g of carbon powder and 0.5 g of Co powder were mixed and ball milled for 36 hours. When the resulting mixed powder was reacted at 1700° C. (A) and at 1900° C. (B) in a hydrogen stream and a nitrogen stream, there was obtained no theoretical carbide as shown in Table 11:

Table 11

| | Heating Temperature | Total Carbon | Free Carbon | Combined Carbon Theoretical Carbon |
|---|---|---|---|---|
| Prior Art (A) | 1700° C. | 8.91% | 1.38% | 84.8% |
| Prior Art (B) | 1900° C. | 8.92% | 0.45% | 95.4% |

X-ray diffraction showed that $Mo_2C$ was detected in the carbide.

EXAMPLE 17

81 g of $MoO_3$ powder and 58 g of $WO_3$ powder were respectively dissolved in 28% aqueous ammonia and gradually added to a solution of hydrochloric acid to precipitate $H_2MoO_4$ and $H_2WO_4$. When the precipitation was completed, both the precipitates were mixed to which 5 g of $V_2O_5$ powder was simultaneously added with agitation, washed with water and filtered to obtain a mixture of oxides. The resulting mixture was fired at 800° C. in the air, charged in a nickel boat which was then covered, and reduced at 1000° C. in a hydrogen stream to form an alloy powder with a particle size of 4 microns.

The (Mo, W) alloy powder obtained in this way was mixed with 9.0% of carbon powder and ball milled for 36 hours. The mixed powder was reacted at 1650° C. in a hydrogen stream and a nitrogen stream for 1 hour. The resulting carbide was subjected to analysis to obtain results as shown in Table 12:

Table 12

| Total Carbon | Free Carbon | Combined Carbon | Combined Carbon Theoretical Carbon |
|---|---|---|---|
| 8.97% | 0.04% | 8.94% | 99.8% |

As evident from these results, the carbon was combined sufficiently and theoretically, thus forming a monocarbide of WC type.

EXAMPLE 18

81 g of $MoO_3$ powder and 58 g of $WO_3$ powder were dissolved respectively in 28% aqueous ammonia and gradually added to a solution of hydrochloric acid to precipitate $H_2MoO_4$ and $H_2WO_4$. When the precipitation was completed, both the precipitates were mixed to which 10 g of $MoS_2$ powder was simultaneously added with agitation, washed with water and filtered to obtain a mixture of oxides. The resulting mixture was fired at 800° C. in the air, charged in a nickel boat which was then covered, and reduced at 1000° C. in a hydrogen stream to form an alloy powder with a particle size of 2 microns.

The (Mo, W) alloy powder obtained in this way was mixed with 9.5% of carbon powder and ball milled for 36 hours. The mixed powder was reacted at 1700° C. in a hydrogen stream and a nitrogen stream for 1 hour. The thus resulting carbide was subjected to analysis to obtain results as shown in Table 13:

Table 13

| Total Carbon | Free Carbon | Combined Carbon | Combined Carbon Theoretical Carbon |
|---|---|---|---|
| 9.32% | 0.02% | 9.30% | 99.8% |

As evident from these results, the carbon was combined sufficiently and theoretically, thus forming a monocarbide of WC type.

What is claimed is:

1. A process for the production of an alloy powder for powder metallurgy, said alloy powder consisting essentially of a solid solution of molybdenum and tungsten each in a proportion of from 5 to 95 atomic %, and having a particle size of at most 20 microns, which process comprises mixing molybdenum and tungsten in the form of compounds thereof selected from the group consisting of oxides, hydroxides, chlorides, sulfates, nitrates, metallic acids, salts of metallic acids and mixtures thereof, the resulting mixture of the compounds having a particle size of at most 1 micron, and then reducing the mixture with at least one member selected from the group consisting of hydrogen and ammonia.

2. The process as claimed in claim 1, wherein the molybdenum compound has an anion portion which is different from the anion portion of the tungsten compound.

3. The process as claimed in claim 1, wherein at least one of the compounds is used in the form of a solution.

4. A process for the production of an alloy powder containing molybdenum and tungsten and having a crystal structure of simple hexagonal WC type, which comprises mixing molybdenum and tungsten in the form of compounds thereof selected from the group consisting of oxides, hydroxides, chlorides, sulfates, nitrates, metallic acids, salts of metallic acids and mixtures thereof, the resulting mixture of the compounds having a particle size of at most 1 micron, reducing the mixture with at least one member selected from the group consisting of hydrogen and ammonia to form an alloy powder of molybdenum and tungsten, and then carburizing the alloy powder.

5. The process as claimed in claim 4, wherein at least one of the compounds is used in the form of a solution.

6. The process as claimed in claim 4, wherein molybdenum oxide and tungsten oxide are mixed mechanically.

7. The process as claimed in claim 4, wherein ammoniacal solutions of molybdenum and tungsten are mixed.

8. The process as claimed in claim 4, wherein molybdenum oxide is mixed with an ammoniacal solution of tungsten.

9. The process as claimed in claim 4, wherein tungsten oxide is mixed with an ammoniacal solution of molybdenum.

10. The process as claimed in claim 4, wherein the final heating step is carried out in an atmosphere selected from the group consisting of nitrogen, carbon monoxide and carbon dioxide.

11. The process as claimed in claim 4, wherein the final heating step is carried out in the presence of at most 0.5% of at least one member selected from the group consisting of iron, nickel and cobalt as a diffusion aiding agent.

12. The process as claimed in claim 11, wherein the iron is used in the form of a compound.

13. The process as claimed in claim 4, wherein the carburized product is cooled to normal temperature and reheated at a temperature of 1000° to 1800° C.

14. The process as claimed in claim 4, wherein, during the mixing step, at least one member selected from the group consisting of titanium, zirconium, hafnium, vanadium, tantalum, niobium and chromium is further added in the form of compounds.

15. The process as claimed in claim 4, wherein the carburizing is carried out at a temperature of at least 1200° C.

16. The process as claimed in claim 4, wherein the molybdenum compound has an anion portion which is different from the anion portion of the tungsten compound.

17. The process as claimed in claim 4, wherein at least one member selected from the group consisting of particle growth promoters, particle growth retarders and carburization reaction retarders is added to the mixture.

18. The process as claimed in claim 17, wherein the particle growth promoter is sodium or potassium.

19. The process as claimed in claim 17, wherein the particle growth retarder is titanium, vanadium or chromium.

20. The process as claimed in claim 17, wherein the carburization reaction retarder is sulfur or a sulfur compound.

* * * * *